(12) United States Patent
Ji

(10) Patent No.: US 11,540,905 B2
(45) Date of Patent: Jan. 3, 2023

(54) SELF-LIGATING ORTHODONTIC BRACKET AND OPENING METHOD THEREOF

(71) Applicant: GUANGZHOU OO MEDICAL SCIENTIFIC LIMITED, Guangdong (CN)

(72) Inventor: Li Ji, Guangdong (CN)

(73) Assignee: GUANGZHOU OO MEDICAL SCIENTIFIC LIMITED, Guangdong (CN)

(*) Notice: Subject to any disclaimer, the term of this patent is extended or adjusted under 35 U.S.C. 154(b) by 192 days.

(21) Appl. No.: 16/685,207

(22) Filed: Nov. 15, 2019

(65) Prior Publication Data
US 2020/0078141 A1    Mar. 12, 2020

Related U.S. Application Data

(63) Continuation of application No. PCT/CN2018/087252, filed on May 17, 2018.

(30) Foreign Application Priority Data

May 19, 2017 (CN) .......................... 201710361308.2

(51) Int. Cl.
A61C 7/28 (2006.01)
A61C 7/02 (2006.01)

(52) U.S. Cl.
CPC ................ A61C 7/287 (2013.01); A61C 7/02 (2013.01)

(58) Field of Classification Search
CPC ........... A61C 7/287; A61C 7/02; A61C 7/146; A61C 7/16; A61C 7/14; A61C 7/141; A61C 7/30; A61C 7/28; A61C 7/285
(Continued)

(56) References Cited

U.S. PATENT DOCUMENTS 8,297,970 B2 * 10/2012 Kanomi ................. A61C 7/287
433/13
9,987,106 B2 * 6/2018 Choi ...................... A61C 7/287
(Continued)

FOREIGN PATENT DOCUMENTS

CN        104055587 A  *  9/2014  ............. A61C 7/14
CN        104138299 A  *  11/2014  ............ A61C 7/287
(Continued)

OTHER PUBLICATIONS

Wang, Jian-jun; A Lock Sheet For Tooth Orthodontic Self-Locking; Oct. 14, 2015, Machine Translated From Espace.net (Year: 2015).*
(Continued)

Primary Examiner — Heidi M Eide
Assistant Examiner — Holly T. To
(74) Attorney, Agent, or Firm — Lathrop GPM LLP

(57) ABSTRACT

A self-ligating orthodontic bracket. The self-ligating orthodontic bracket comprises a bracket body and a movable closure member, and the bracket body includes a first body portion, a second body portion and an archwire slot therebetween, running through the bracket body. The movable closure member is engaged with the second body portion and movable relative thereto between an opened position and a closed position; the first body portion and/or the movable closure member include, at the inward end thereof, a tool receptacle having a receptacle top and a receptacle bottom, and the tool receptacle is adjacent to the archwire slot, the archwire slot and the first body portion co-form a first side surface, while the archwire slot and the second body portion co-form a second side surface, the tool receptacle includes a smooth surface that slopes downwardly to the first side surface.

12 Claims, 9 Drawing Sheets

(58) Field of Classification Search
USPC .......................................................... 433/13
See application file for complete search history.

(56) References Cited

U.S. PATENT DOCUMENTS

| | | | |
|---|---|---|---|
| 10,772,708 B2* | 9/2020 | Yeh .................. | A61C 7/287 |
| 11,076,936 B2* | 8/2021 | Lai ................... | A61C 7/287 |
| 2004/0072117 A1* | 4/2004 | Farzin-Nia ........ | A61C 7/287 |
| | | | 433/10 |
| 2004/0166458 A1 | 8/2004 | Perry et al. | |
| 2005/0239012 A1* | 10/2005 | Bathen .............. | A61C 7/287 |
| | | | 433/10 |
| 2009/0004619 A1* | 1/2009 | Oda .................. | A61C 7/287 |
| | | | 433/24 |
| 2009/0325120 A1* | 12/2009 | Lewis ............... | A61C 7/287 |
| | | | 433/13 |
| 2010/0112508 A1* | 5/2010 | Lopes ............... | A61C 7/287 |
| | | | 433/10 |
| 2010/0178629 A1* | 7/2010 | Oda .................. | A61C 7/125 |
| | | | 433/14 |
| 2010/0285420 A1* | 11/2010 | Oda .................. | A61C 7/287 |
| | | | 433/11 |
| 2010/0311004 A1* | 12/2010 | Voudouris ......... | A61C 7/14 |
| | | | 433/11 |
| 2012/0028206 A1* | 2/2012 | Lopes ............... | A61C 7/287 |
| | | | 433/10 |
| 2013/0189639 A1* | 7/2013 | Dupray ............. | A61C 7/143 |
| | | | 433/13 |
| 2014/0134563 A1* | 5/2014 | Voudouris ......... | A61C 7/30 |
| | | | 433/11 |
| 2014/0141383 A1* | 5/2014 | Hagelganz ........ | A61C 7/30 |
| | | | 433/9 |
| 2014/0272753 A1* | 9/2014 | Sommer ............ | A61C 7/287 |
| | | | 433/11 |
| 2014/0308622 A1* | 10/2014 | Voudouris ......... | A61C 7/287 |
| | | | 433/10 |
| 2015/0050612 A1* | 2/2015 | Damon ............. | A61C 7/14 |
| | | | 433/13 |
| 2015/0125804 A1* | 5/2015 | D'Amico .......... | A61C 7/287 |
| | | | 433/10 |
| 2015/0216629 A1* | 8/2015 | Voudouris ......... | A61C 7/287 |
| | | | 433/9 |
| 2016/0045286 A1* | 2/2016 | Damon ............. | A61C 7/141 |
| | | | 433/16 |
| 2016/0354181 A1* | 12/2016 | Sommer ............ | A61C 7/287 |
| 2016/0367340 A1* | 12/2016 | Ward ................ | A61C 7/287 |
| 2018/0271623 A1* | 9/2018 | Ruiz-Vela ........ | A61C 7/287 |
| 2019/0209270 A1* | 7/2019 | Long ................ | A61C 7/287 |

FOREIGN PATENT DOCUMENTS

| | | | | |
|---|---|---|---|---|
| CN | 104958114 A | | 10/2015 | |
| CN | 104958114 A | * | 10/2015 | ............. A61C 7/34 |
| CN | 104970890 A | * | 10/2015 | ............. A61C 7/30 |
| CN | 104970890 A | | 10/2015 | |
| CN | 204971652 U | | 1/2016 | |
| CN | 204971653 U | | 1/2016 | |
| CN | 204971653 U | * | 1/2016 | ............. A61C 7/287 |
| CN | 205359671 U | * | 7/2016 | ............. A61C 7/287 |
| CN | 205626154 U | | 10/2016 | |
| CN | 106236296 A | * | 12/2016 | ............. A61C 7/34 |
| CN | 107019569 A | * | 8/2017 | ............. A61C 7/287 |
| CN | 107019569 A | | 8/2017 | |
| CN | 108125725 A | * | 6/2018 | ............. A61C 7/303 |
| CN | 109394358 A | * | 3/2019 | ............. A61C 7/287 |
| EP | 2671535 A1 | * | 12/2013 | ............. A61C 7/30 |
| EP | 3045144 A2 | * | 7/2016 | ............. A61C 7/287 |
| EP | 3138529 A1 | * | 3/2017 | ............. A61C 7/287 |
| KR | 20180075903 A | * | 7/2018 | ............. A61C 7/287 |
| WO | WO-2009015157 A1 | * | 1/2009 | ............. A61C 7/287 |
| WO | WO-2009057937 A2 | * | 5/2009 | ............. A61C 7/28 |
| WO | WO-2010083491 A | * | 7/2010 | ............. A61C 7/303 |
| WO | WO-2013052029 A1 | * | 4/2013 | ............. A61C 7/287 |
| WO | WO-2014018095 A1 | * | 1/2014 | ............. A61C 7/287 |
| WO | WO-2017008183 A1 | * | 1/2017 | ............. A61C 7/287 |
| WO | WO-2019228427 A1 | * | 12/2019 | ............. A61C 7/30 |
| WO | WO-2021057753 A1 | * | 4/2021 | ............. A61C 7/28 |
| WO | WO-2021175322 A1 | * | 9/2021 | |

OTHER PUBLICATIONS

PCT/CN2018/087252 International Search Report dated Aug. 1, 2018, 2 pages.

\* cited by examiner

SELF-LIGATING ORTHODONTIC BRACKET AND OPENING METHOD THEREOF

CROSS REFERENCE TO RELATED APPLICATIONS

This application is a continuation of PCT/CN2018/087252, filed May 17, 2018, which claims the priority benefit of Chinese Patent Application No. 201710361308.2, filed May 19, 2017. The contents of those applications are incorporated by reference in their entirety.

FIELD

The present disclosure relates to a system and method for orthodontic teeth, in particular to an orthodontic system and method that include one or more appliances installed (in a removable or rigid manner) on a patient's teeth.

BACKGROUND OF THE INVENTION

Orthodontic appliances are commonly used to correct misaligned teeth. Orthodontic bracket is a principal component of orthodontic appliances. An orthodontist or an assistant engages an archwire into a slot of each bracket. The brackets are used to affixed to the patient's teeth, and the archwire applies corrective forces to coerce the teeth to move into correct positions by the brackets.

Most of the present self-ligating brackets include a bracket body and a ligating slide, wherein the ligating slide is engaged with bracket body and movable relative thereto between an opened position in which the archwire is insertable into the archwire slot, and a closed position in which the ligating slide retains the archwire in the archwire slot.

In order to open the archwire slot on the bracket body, the bracket body includes a tool receptacle configured to receive the tip of a tool that facilitates opening the ligating slide. The tool receptacle of the brackets on the market are all in a rectangular parallelepiped shape adapting for the tip of the miniature flathead tool. In operation, the tip of the tool is inserted into the tool receptacle and rotated in either the clockwise or counter-clockwise direction. During the rotation of the tool, the tool bears against the ligating slide, so that the ligating slide moves in the gingival direction relative to the bracket body toward the opened position. However, there are two problems in the operation of opening the archwire slot on the bracket body. In one aspect, the tool should be a specified tool with a flathead, thus a usage of the specified tools may cause inconvenience to orthodontists. In another aspect, during the rotation of the tool, a static friction force is formed between the self-ligating bracket and the patient's tooth, which would reduce the bond reliability between the bracket and the tooth, resulting in prolonging the orthodontic treatment. What's even worse is that, the self-ligating bracket may be easily dropped off, causing medical malpractice.

SUMMARY

To these ends, a self-ligating orthodontic bracket with an archwire slot that can be easily opened is provided. The self-ligating orthodontic bracket comprises a bracket body and a movable closure member, wherein the bracket body includes a first body portion, a second body portion and an archwire slot therebetween, running through the bracket body, and the movable closure member is engaged with the second body portion and movable relative thereto between an opened position in which the archwire is insertable into the archwire slot, and a closed position in which the movable closure member retains the archwire in the archwire slot, aspectant ends of the first body portion and the movable closure member are their respective inward ends; the first body portion and/or the movable closure member include a tool receptacle having a receptacle top and a receptacle bottom, and the tool receptacle is provided at an inward end of the first body portion and/or the movable closure member and adjacent to the archwire slot, the archwire slot and the first body portion co-form a first side surface, while the archwire slot and the second body portion co-form a second side surface, the tool receptacle includes a smooth surface that slopes downward to the first side surface, in operation, a tip of an opening tool is inserted into the tool receptacle, then the tip of said opening tool slides along the smooth surface downwardly to the receptacle bottom, whereby said opening tool pushes the moveable closure member so as to open the archwire slot.

The tool receptacle is provided for receiving said opening tool, in which a sloped smooth surface is provided. When opening the archwire slot, the tip of said opening tool is inserted into the tool receptacle, then the tip of said opening tool slides along the smooth surface downwardly to the receptacle bottom, whereby said opening tool pushes the moveable closure member so as to open the archwire slot. The self-ligating orthodontic bracket is operable for the orthodontists, simultaneously saving time in replacement of tool and operation, thus bringing about an improvement of the orthodontists. The archwire slot is opened in the process of the insertion of said opening tool, wherein an external force from said opening tool would not induce a static friction force between the self-ligating orthodontic bracket and a tooth, meaning that the opening process would not impact the bond reliability, which effectively guarantees the orthodontic treatment and avoids medical malpractice as well.

In one exemplary embodiment, the smooth surface includes a first section and a second section in a sequence from a top of the smooth surface to a bottom of the smooth surface, wherein the first section is connected to the second section. An angle between a tangent of the second section and the first side surface or the second side surface gradually decreases along the direction from the top to the bottom of the smooth surface. The second section is a curved surface that is an outwardly convex. A downward force is applied to said opening tool, then the tip of said opening tool would slide along the second section from its top to its bottom easily with the aid of the outwardly convex shape of the second section. During the sliding process, a side wall of said opening tool bears against the moveable member, and thus opens the archwire slot. The entire opening operation is much easier than that in the conventional operation. In contrast, if the second section is a curved surface that is inwardly concave, the downward force might not drive said opening tool declining but standing still.

In another exemplary embodiment, the angle between a tangent of the first section and the first side surface or the second side surface gradually increases along the direction from the top to the bottom of the smooth surface. The first section is able to direct the insertion of said opening tool, convenient for said opening tool in place to open the movable closure member.

The first section smoothly connects to the second section, which help said opening tool easily sliding from the first section to the second section.

In yet another exemplary embodiment, the bottom of the smooth surface is the receptacle bottom, whereby said opening tool can push the movable closure member to a distal end when the tip of said opening tool slides along the direction to the bottom of the smooth surface.

In yet another exemplary embodiment, the smooth surface is a curved bevel, the top of the smooth surface includes an arc shape, the smooth surface is gradually narrowed from the top to the bottom thereof, and the bottom of the smooth surface is an arc or a point. The tool receptacle is approximate to a half of an eye, such that the bracket is recognizable and special.

In yet another exemplary embodiment, both the first body portion and the movable closure member include the tool receptacles, wherein the tool receptacle on the first body portion and the tool receptacle on the movable closure member are symmetrical. Both of the tool receptacles co-form a relatively larger receptacle for said opening tool to insert thereto.

In yet another exemplary embodiment, the tool receptacle further includes a sinking settlement step, disposed on the inward end of the first body portion and/or on the inward end of the movable closure member, adjacent to the archwire slot, wherein the top of the smooth surface is connected to a bottom of the sinking settlement step, and wherein the receptacle top is the top of the sinking settlement step. In consideration of a miniature size of the tool receptacle, the provided sinking settlement step may enlarge the size of the tool receptacle for said opening tool to insert thereto.

In yet another exemplary embodiment, the smooth surface is an inclined surface, and the sinking settlement step includes a concave surface extending in a direction perpendicular to a bottom of the archwire slot, wherein a bottom of the concave surface is connected to the top of the smooth surface.

In yet another exemplary embodiment, the sinking settlement step includes a concave surface extending along a direction perpendicular to the bottom of the archwire slot and a planar surface perpendicular to the first side surface, wherein the planar surface is connected to the top of the smooth surface.

In yet another exemplary embodiment, the first body portion includes a receiving step on the first side surface, wherein the receiving step is disposed parallel to the archwire slot. The receiving step is used to receive an inward end of the movable closure member. When the movable closure member is in the closed position, the inward end of the movable closure member is on the receiving step, abutting against a side wall of the receiving step. A bottom of the movable closure member abuts against a base surface of the receiving step.

In yet another exemplary embodiment, the bottom of the smooth surface is disposed between the base surface of the receiving step and the bottom of the archwire slot. Since the bottom of the smooth surface is below the base surface of the receiving step, said opening tool can push the movable closure member to the distal end when the tip of said opening tool slides along the direction to the bottom of the smooth surface.

In one exemplary embodiment, the second body portion includes a sliding groove along which the movable closure member slides, having a reversed-T cross section, wherein two lateral sides of the movable closure member protrude outward to form two lateral protrusions, while two lateral sides of the sliding groove respectively include rails along which the lateral protrusions slide. In such way, the movable closure member can be slidable relative to the sliding groove, whereby the archwire slot is opened/closed.

In yet another exemplary embodiment, the movable closure member includes a guiding slider extending along the sliding direction of the movable closure member, while the sliding groove includes a guiding slot along which the guiding slider slides. The guiding slider and the guiding slot are used to define the sliding direction of the movable closure member.

In yet another exemplary embodiment, the guiding slot is disposed on one of the two rails.

The tool receptacles of the present brackets on the market is difficult to operate, and the external force applied to the brackets induces a static friction force between the self-ligating brackets and the teeth surface, whereby the bond between the brackets and the teeth could be reduced, and the brackets are easy to drop off, which would result in medical malpractice. To this end, the self-ligating orthodontic bracket is provided in this application. In operation, the tip of said opening tool is inserted into the tool receptacle, then slid along the smooth surface downwardly to the receptacle bottom, whereby said opening tool pushes the moveable closure member so as to open the archwire slot. Compared to the prior art, the advantages of the self-ligating orthodontic bracket are as follows: firstly, the opening process of the self-ligating bracket of the present invention is significantly simple. The shape of the tool receptacle which is not designed for a specific tool, can be accommodative for the shapes of common dental tools. Any common dental tools, such as a probe, can be inserted into the tool receptacle. During the insertion, the tip of the probe slides along the inclined smooth surface to the receptacle bottom, whereby the probe pushes the movable closure member to open the archwire slot. The self-locking bracket is convenient for the orthodontist to operate, reducing the time for replacing tools and operating, effectively reducing the orthodontist's working time and improving their working efficiency. Secondly, the archwire slot can be opened by inserting said opening tool. The external force applied from said opening tool to bracket would not induce a static friction between the self-ligating bracket and the tooth surface during the opening process, and the opening process would not impact the bonding stability of the bracket. The orthodontic treatment can be guaranteed and the medical accidents can be avoided.

BRIEF DESCRIPTION OF THE DRAWINGS

The accompanying drawings, which are incorporated in and constitute a part of this specification, illustrate embodiments of the invention and, together with a general description of the invention given above, and the detailed descriptions given below, serve to explain the invention.

DETAILED DESCRIPTION

Figure 1:
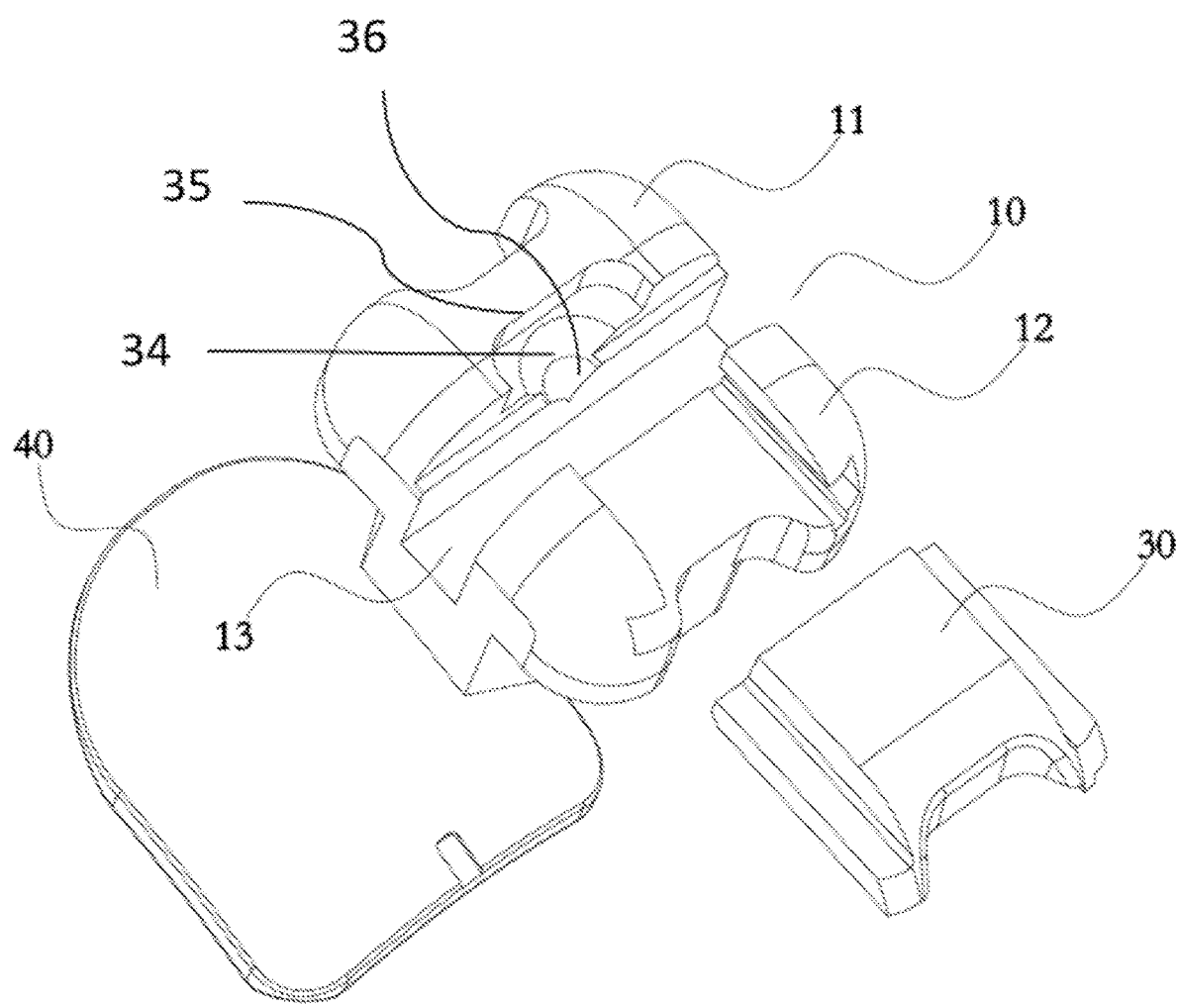
FIG. 1 is a schematic exploded view of a self-ligating orthodontic bracket in accordance with the first embodiment of the invention.
Figure 2:
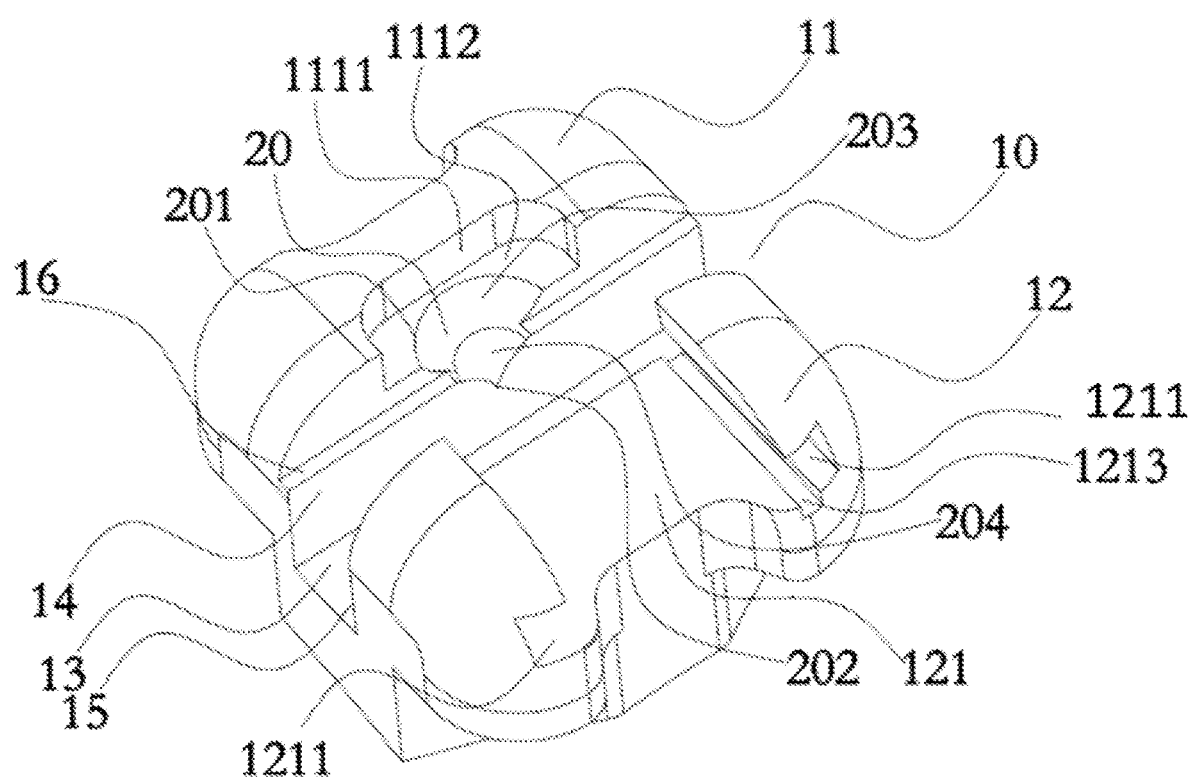
FIG. 2 is a schematic view of a bracket body in accordance with the first embodiment of the invention.
Figure 3:
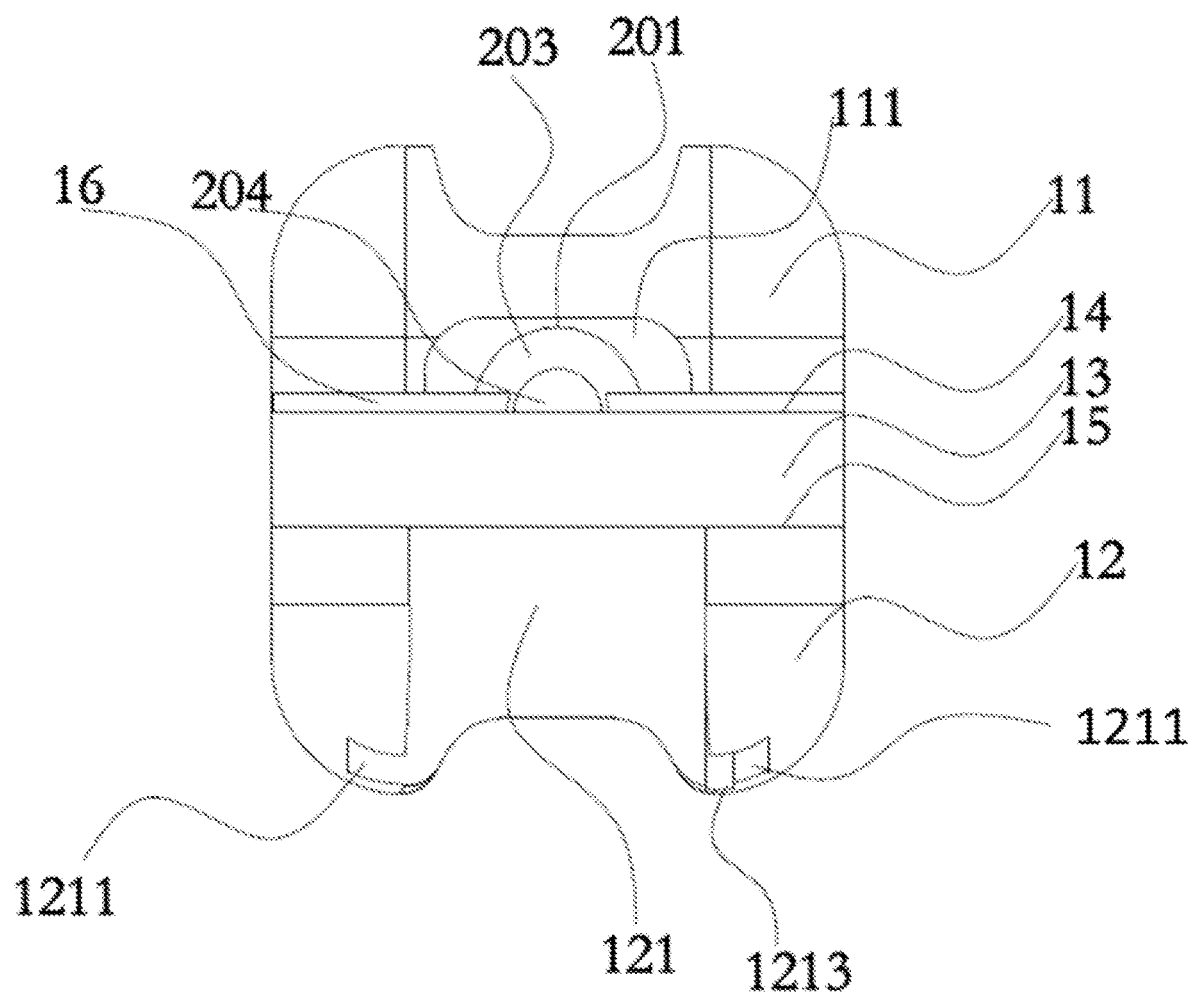
FIG. 3 is a front view of the bracket body in accordance with the first embodiment of the invention.

Although the invention will be described in connection with certain embodiments, the invention is not limited to practice in any one specific type of self-ligating orthodontic bracket. The description of the embodiments of the invention is intended to cover all alternatives, modifications, and equivalent arrangements as many be included within the spirit and scope of the invention as defined by the appended claims. In particular, those skilled in the art will be recognize that the components of the embodiments of the invention described herein could be arranged in multiple different ways.

First Embodiment

Referring now to FIGS. 1-5, a self-ligating orthodontic bracket includes a pad 40, a bracket body 10 and a movable closure member 30. The pad 40 is used to bond to the tooth. The pad 40 is fixedly connected to the bracket body 10. The bracket body 10 includes a first body portion 11, a second body portion 12 and an archwire slot 13 configured between the first body portion 11 and the second body portion 12, running through the bracket body 10. The archwire slot 13 is adapted to receive an archwire. The moveable closure member 30 is engaged with the bracket body 10 and movable relative thereto between an opened position in which the archwire is insertable into the archwire slot 13, and a closed position in which the movable closure member 30 retains the archwire in the archwire slot 13. In this embodiment, the movable closure member 30 is a ligating slide.

The bracket body 10 includes a tool receptacle having a receptacle top and a receptacle bottom, disposed at the inward end of the first body portion 11 and adjacent to the archwire slot 13. The archwire slot 13 and the first body portion 11 co-form a first side surface 14, while the archwire slot 13 and the second body portion 12 co-form a second side surface 15. The tool receptacle includes a smooth surface 20 that slopes downward to the inward end of the first body portion 11. The tool receptacle is adapted to allow an insertion of an opening tool, in which a sloped smooth surface 20 is arranged. In operation, a tip of the opening tool is inserted into the tool receptacle, then the tip of the opening tool slides along the smooth surface 20 downwardly to the receptacle bottom, whereby the opening tool pushes the moveable closure member 30 so as to open the archwire slot 13.

The conventional tool receptacle of the brackets on the market are all in a rectangular parallelepiped shape adapting for the tip of miniature flathead tool. Since the bracket is used to bond on patient's teeth, the size of the bracket is comparatively smaller than human teeth. The length and width of a bracket are in the range of 2-4 mm. The size of the tool receptacle is even smaller. In operation, the tip of the tool is inserted into the conventional tool receptacle and rotated in either the clockwise or counter clockwise direction by 90 degrees. During the rotation of the opening tool, it bears against the ligating slide, so that the ligating slide moves in the gingival direction relative to the bracket body toward the open position. However, the self-ligating orthodontic brackets on the market require special tools, and thus replacement of these special tools consumes orthodontist's working time; as the size of the tool receptacle is relatively small, it is difficult for the opening process and application of external forces; moreover, during the rotation of the tool, a static friction force is induced between the self-ligating orthodontic bracket and the patient's tooth, thereby weakening the bond between the bracket and the tooth, resulting in prolonging the orthodontic treatment. What's even worse is that, the self-ligating orthodontic bracket may be easily dropped off, causing medical malpractice.

The smooth surface 20 includes a first section 203 and a second section 204 in a sequence from the top 201 of the smooth surface 20 to the bottom 202 of the smooth surface 20, wherein the first section 203 is connected to the second section 204, and an angle between a tangent of the second section 204 and the first side surface 14 gradually decreases along the direction from the top 201 to the bottom 202 of the smooth surface 20. The second section 204 is a curved surface that is an outwardly convex. A downward pressure is applied to the opening tool getting close to the second section 204, then the tip of the opening tool would slide along the second section 204 from its top to its bottom easily with the aid of the outwardly convex shape of the second section 204. During the sliding process, the side wall of the opening tool bears against the moveable closure member 30, and thus opens the archwire slot 13. The entire opening operation is much easier than that in the conventional operation. In contrast, if the second section 204 is a curved surface that is inwardly concave, the downward force might not drive the opening tool declining but standing still.

In this embodiment, the bottom 202 of the smooth surface 20 is the receptacle bottom. The tip of the opening tool could slide down the smooth surface 20 all the way to the bottom 202. Since the bottom 202 of the smooth surface 20 is the receptacle bottom, the opening tool can push the movable closure member 30 to a distal end. In other embodiments, the bottom 202 of the smooth surface 20 may not be the receptacle bottom. The smooth surface 20 may also be connected to a plane, which configuration may be still included within the spirit and scope of the invention as defined by the appended claims.

Figure 4:
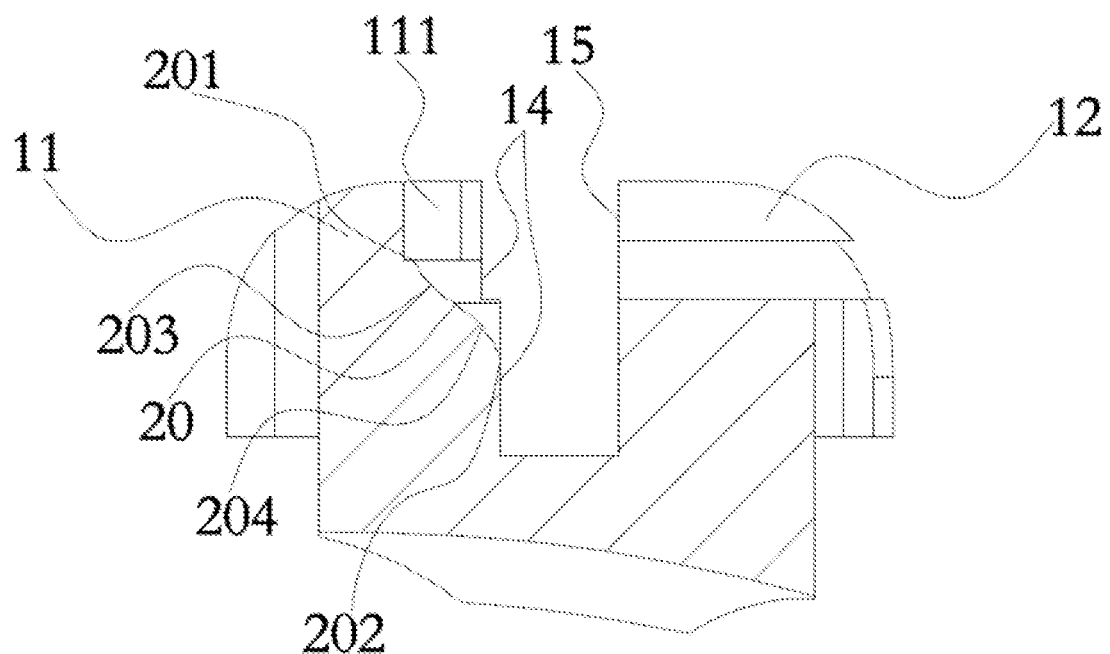
FIG. 4 is a partial cross-sectional view of the bracket body in accordance with the first embodiment of the invention.
Figure 5:
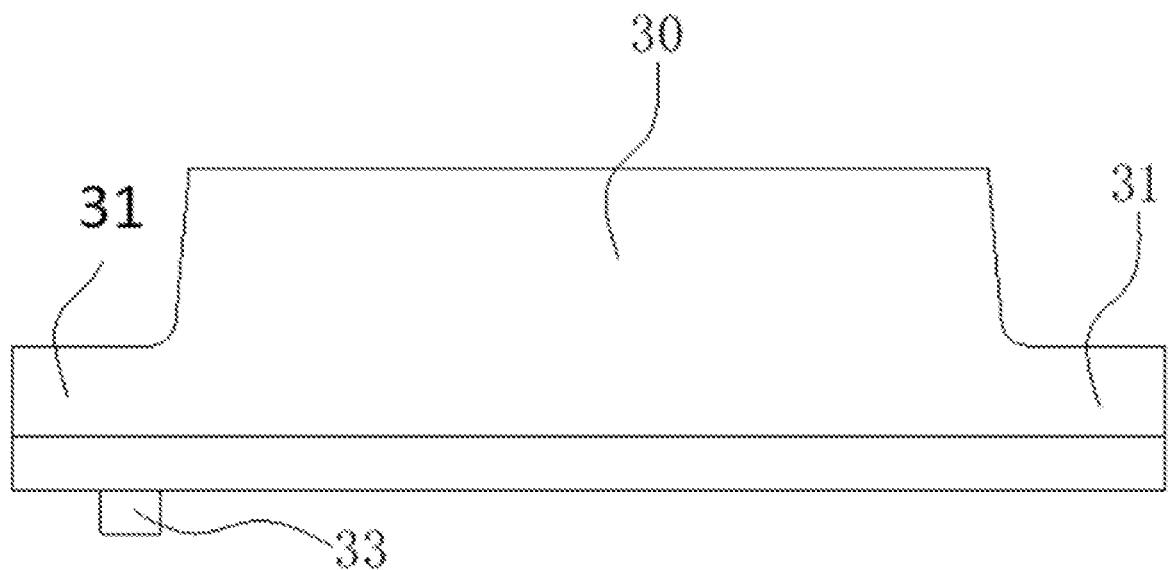
FIG. 5 is a front view of a movable closure member in accordance with the first embodiment of the invention.

Referring now to FIG. 4, an angle between a tangent of the first section 203 and the first side surface 14 gradually increases along the direction from the top 201 to the bottom 202 of the smooth surface 20. The first section 203 is a curved surface that is inwardly concave, assisting in guiding the opening tool into the tool receptacle. In other embodiments, an angle between a tangent of the first section 203 and the first side surface 14 is constant, which configuration may be still included within the spirit and scope of the invention as defined by the appended claims.

Further in the present embodiment, the first section 203 smoothly connects to the second section 204. The smooth transition therebetween is beneficial to the sliding process of the tip of the opening tool from the first section 203 to the second section 204.

The smooth surface 20 is a curved bevel, the first section 203 and the second section 204 are approximately circular mesas. The top 201 of the smooth surface 20 includes an arc shape, and the bottom of the smooth surface 20 is a point or an arc. In this embodiment, the bottom of the smooth surface 20 is a point. The smooth surface 20 is approximate to a half of an eye. Because of attractive appearance of the tool receptacle, the bracket can be easy to identify. The opening process is similar to that mentioned above, which is not repeated here.

The tool receptacle further includes a sinking settlement step 111, disposed on the inward end of the first body portion 11, adjacent to the archwire slot 13. The top 201 of the smooth surface 20 is connected to the bottom of the sinking settlement step 111. The receptacle top is the top of the sinking settlement step 111. In consideration of a miniature size of the tool receptacle, the provided sinking settlement step 111 may enlarge the size of the tool receptacle for the opening tool to insert thereto. Further in the present embodiment, the sinking settlement step 111 includes a concave surface 1111 extending along a direction perpendicular to the bottom of the archwire slot 13 and a planar surface 1112 perpendicular to the first side surface 14. The planar surface 1112 is connected to the top 201 of the smooth surface 20.

The first body portion 11 includes a receiving step 16 on the first side surface 14, wherein the receiving step 16 is disposed parallel to the archwire slot 13, and is used to receive the inward end of the movable closure member 30. When the movable closure member 30 is in the closed position, the inward end of the movable closure member 30 is on receiving step 16, abutting against the side wall of the receiving step 16. The bottom of the movable closure member 30 abuts against the base surface of the receiving step 16. The bottom 202 of the smooth surface 20 is disposed between the bottom of the receiving step 16 and the bottom of the archwire slot 13. Since the bottom 202 of the smooth surface 20 is below the base surface of the receiving step 16, the opening tool can push the movable closure member 30 to the distal end.

The second body portion 12 includes a sliding groove 121 along which the movable closure member 30 slides, having a reversed-T cross section, wherein two lateral sides of the movable closure member 30 protrude outward to form two lateral protrusions 31 and 32, while two lateral sides of the sliding groove 121 respectively include rails 1211 and 1212 along which the lateral protrusions 31 and 32 slide. In such way, the movable closure member 30 is movable along the sliding groove 121 between an opened position in which the archwire is insertable into the archwire slot 13, and a closed position in which the movable closure member 30 retains the archwire in the archwire slot 13.

The movable closure member 30 includes a guiding slider 33 extending along the sliding direction of the movable closure member 30, while the sliding groove 121 includes a guiding slot 1213 along which the guiding slider 33 slides. The guiding slider 33 and the guiding slot 1213 are used to define the sliding direction of the movable closure member 30.

Furthermore, the guiding slot 1213 is disposed on the rail 1212; in other embodiments, the guiding slots 1213 may also be respectively disposed on the rails 1211 and 1212.

Second Embodiment

Figure 6:
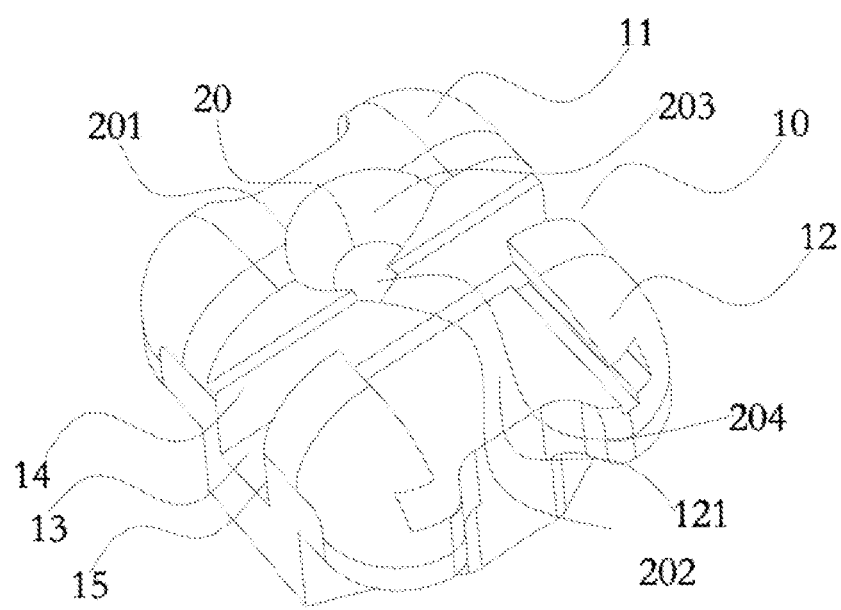
FIG. 6 is a schematic view of a bracket body in accordance with the second embodiment of the invention.
Figure 7:
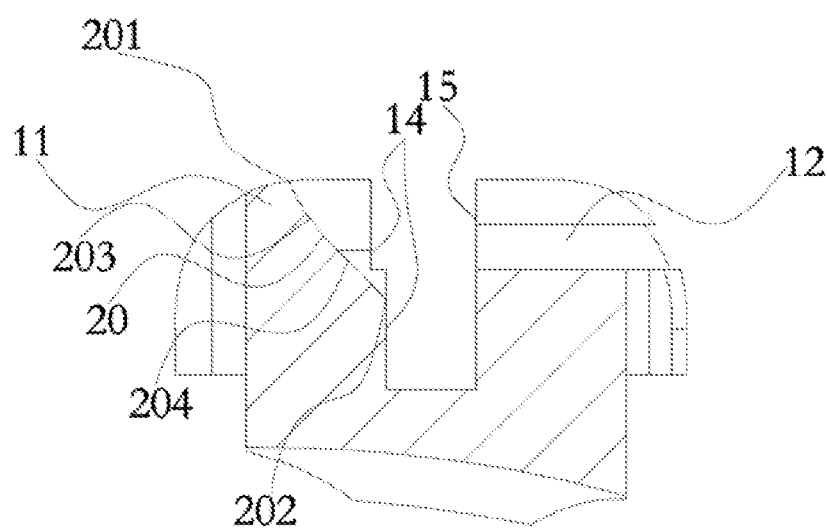
FIG. 7 is a partial cross-sectional view of the bracket body in accordance with the second embodiment of the invention.

Referring to the FIG. 6-7, a self-ligating orthodontic bracket is provided in the present embodiment. The bracket in the present embodiment is analogous to an extent to the bracket in the first embodiment, but the differences are as follows:

The tool receptacle is composed of the smooth surface 20 only. The top 201 of the smooth surface 20 is the receptacle top, while the bottom 202 of the smooth surface 20 is the receptacle bottom. The tool receptacle doesn't include any sinking settlement step.

The smooth surface 20 includes a first section 203 and a second section 204 in a sequence from the top 201 of the smooth surface 20 to the bottom 202 of the smooth surface 20, wherein the first section 203 is connected to the second section 204, and an angle between a tangent of the second section 204 and the first side surface 14 is constant along the direction from the top 201 to the bottom 202 of the smooth surface 20. The second section 204 is a circular mesa. A downward pressure is applied to the opening tool getting close to the second section 204, then the tip of the opening tool would slide along the second section 204 from its top to its bottom easily with the aid of the circular mesa of the second section 204. During the sliding process, the side wall of the opening tool bears against the moveable closure member 30, and thus opens the archwire slot 13. The entire opening operation is much easier than that in the conventional operation. In a preferred configuration, an angle between a tangent of the first section 203 and the first side surface 14 gradually increases along the direction from the top 201 to the bottom 202 of the smooth surface 20. The first section 203 is a curved surface that is inwardly concave, assisting in guiding the opening tool into the tool receptacle.

The smooth surface 20 is a curved bevel, the top 201 of the smooth surface 20 includes an arc shape, and the bottom 202 of the smooth surface 20 is a point, that is, the smooth surface 20 gradually diminishes from the top 201 to the bottom 202 thereof. In this embodiment, the tool receptacle is approximate to a half of an eye. Because of attractive appearance of the tool receptacle, the bracket can be easy to identify.

The rest structure of second embodiment can be referred to the first embodiment, so details are not described herein.

Third Embodiment

Figure 8:
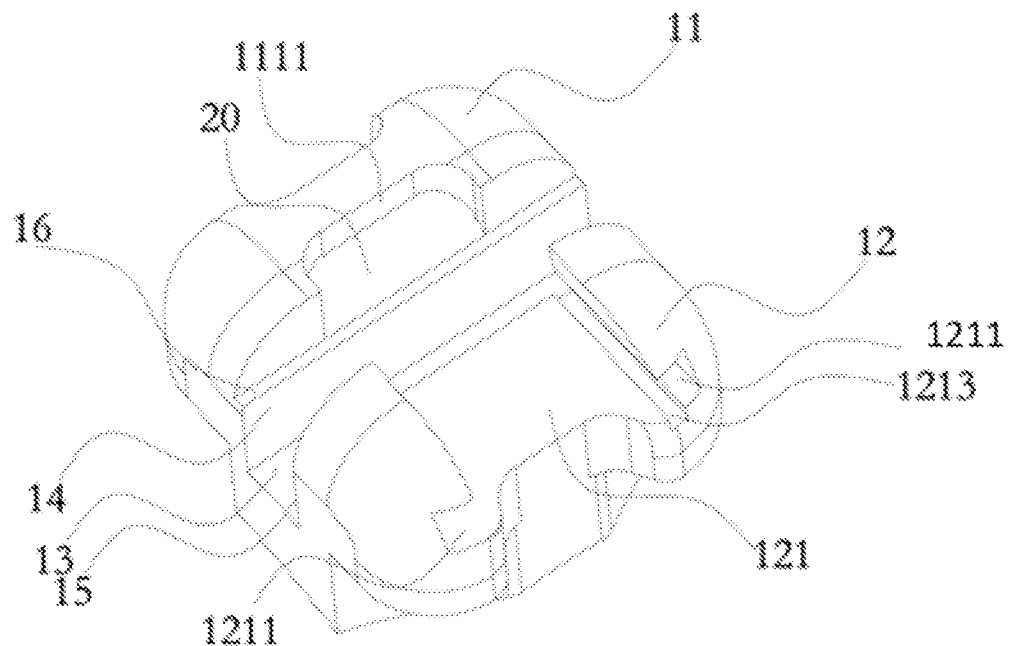
FIG. 8 is a schematic view of a bracket body in accordance with the third embodiment of the invention.

Referring to the FIG. 8, a self-ligating orthodontic bracket is provided. The bracket in the present embodiment is analogous to an extent to the bracket in the first embodiment, but the differences are as follows:

The sinking settlement step 111 is composed of a concave surface 1111 extending in a direction perpendicular to the bottom of the archwire slot 13 only. The concave surface 1111 is connected to the top 201 of the smooth surface 20. The smooth surface 20 is an inclined surface. The bottom 202 of the smooth surface 20 is flush with the base surface of the receiving step 16.

The rest structure of third embodiment can be referred to the first embodiment, so details are not described herein.

Fourth Embodiment

Figure 9:
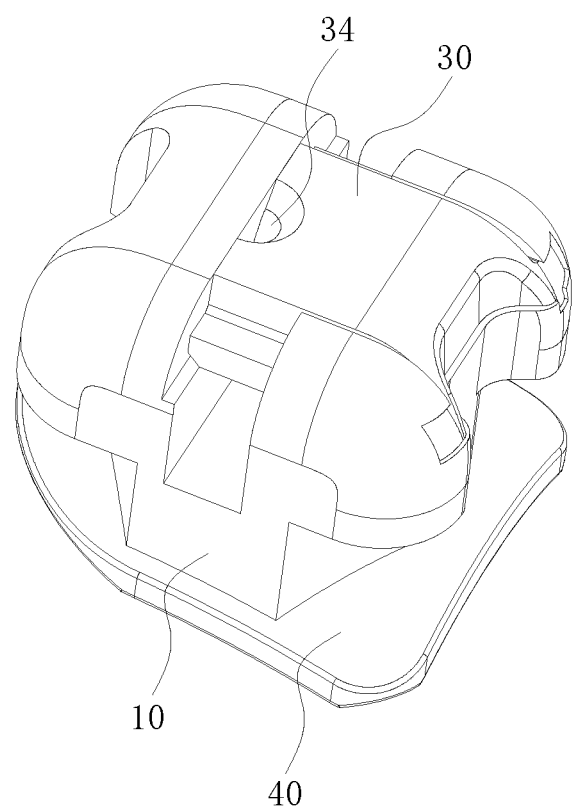
FIG. 9 is a schematic perspective view of a self-ligating bracket according to the fourth embodiment of the present invention.
Figure 10:
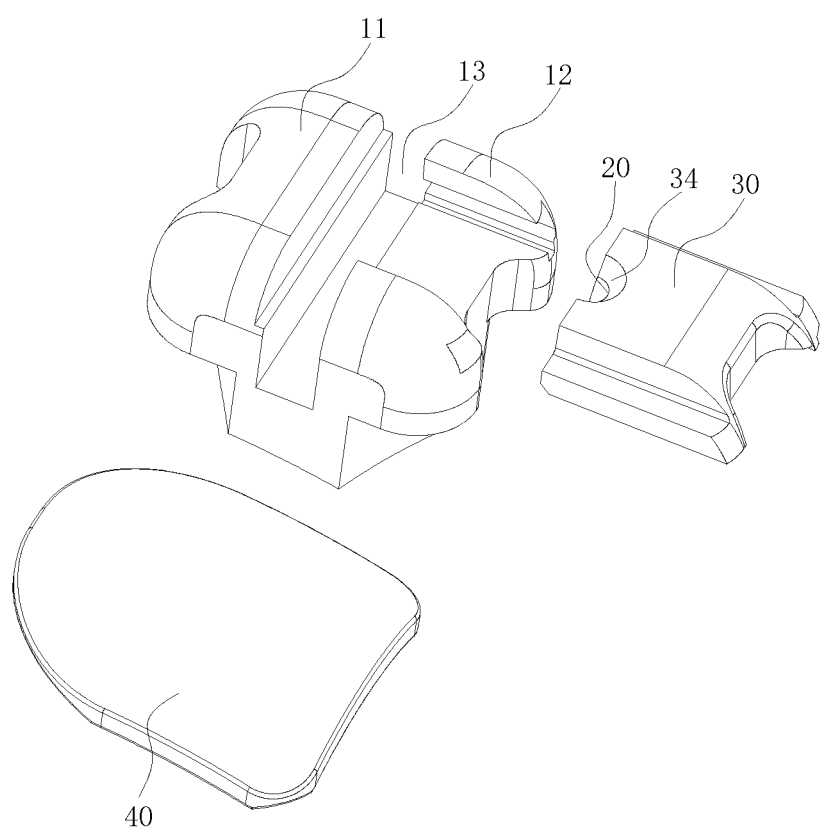
FIG. 10 is a schematic exploded view of the self-ligating orthodontic bracket in accordance with the fourth embodiment of the invention.

Referring to the FIGS. 9-10, a self-ligating orthodontic bracket is provided. The bracket in the present embodiment is analogous to an extent to the bracket in the second embodiment, but the differences are as follows:

The movable closure member 30 includes a tool receptacle 34 disposed on the inward end of the movable closure member 30. The tool receptacle 34 is adjacent to the archwire slot 13. And the tool receptacle 34 includes a smooth surface 20 that slopes downward to the inward end of the movable closure member 30.

The smooth surface 20 includes a first section 203 and a second section 204, and in the present embodiment, the bottom 202 of the smooth surface 20 is the receptacle 34 bottom. In other embodiments, the bottom 202 of the smooth surface 20 may not be the receptacle 34 bottom, instead, the bottom 202 of the smooth surface 20 may be connected to a plane, which is still within the scope of the present invention. The first and second sections 203, 204 are in a sequence from a top of the smooth surface to a bottom of the smooth surface, wherein the first section 203 is connected to the second section 204. And an angle between a tangent of the second section 204 and the second side surface 15 gradually decreases along the direction from the top 201 to the bottom 202 of the smooth surface 20. The second section 204 is a curved surface that is outwardly convex. A downward pressure is applied to the opening tool getting close to the second section 204, then the tip of the opening tool would slide along second section 204 from its top to its bottom easily with the aid of the outwardly convex shape of the second section 204. During the sliding process, the side wall of the opening tool bears against the moveable closure member 30, and thus opens the archwire slot 13. The entire opening operation is much easier than that in the conventional operation.

Referring to FIG. 4, an angle between a tangent of the first section 203 and the second side surface 15 gradually increases along the direction from the top 201 to the bottom 202 of the smooth surface 20. The first section 203 is a curved surface that is inwardly concave, assisting in guiding the opening tool into the tool receptacle 34. In other embodiments, the angle between the tangent of the first section 203 and the second side surface 15 gradually decreases or remains constant along the direction from the top 201 to the bottom 202 of the smooth surface 20, which analogously facilitates opening the archwire slot 13. The description of the embodiments of the invention is intended to cover all alternatives, modifications, and equivalent arrangements as many be included within the spirit and scope of the invention as defined by the appended claims.

Further in the present embodiment, the first section 203 smoothly connects to the second section 204.

The smooth surface 20 is a curved bevel, the top 201 of the smooth surface 20 includes an arc shape, and the bottom of the smooth surface 20 is a point. The bottom of the smooth surface 20 is the receptacle 34 bottom. In operation, a downward force is applied to said opening tool, the tip of the opening tool could slide down the smooth surface 20 all the way to the bottom 202. Since the bottom 202 of the smooth surface 20 is the bottom of the tool receptacle 34, the side wall of the opening tool can push the movable closure member 30 to the distal end.

The rest structure of third embodiment can be referred to the second embodiment, so details are not described herein.

Fifth Embodiment

Figure 11:
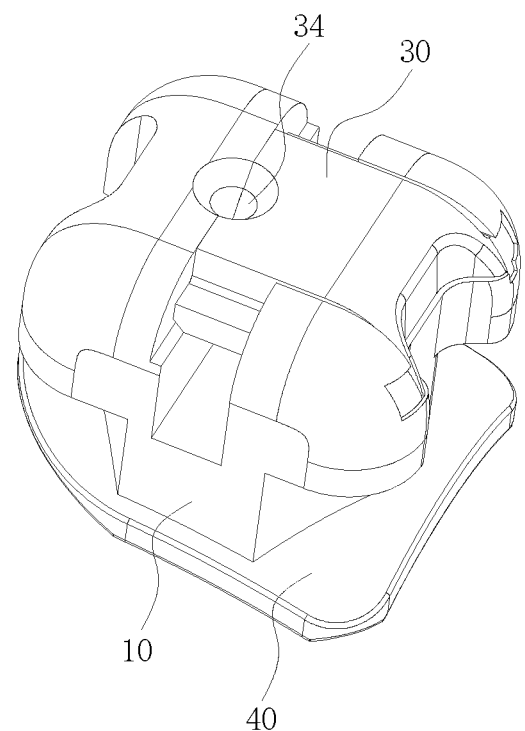
FIG. 11 a schematic perspective view of a self-ligating bracket according to the fifth embodiment of the present invention.
Figure 12:
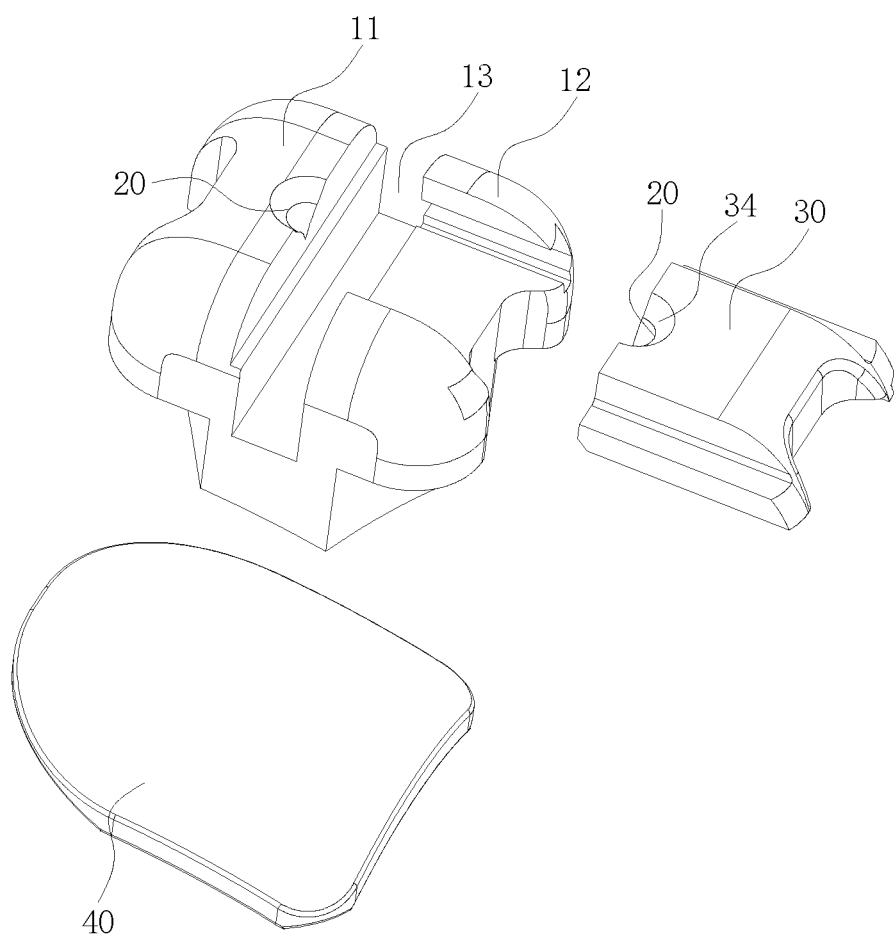
FIG. 12 is a schematic exploded view showing the structure of the self-ligating bracket of the fifth embodiment of the present invention.

Referring to FIGS. 11-12, a self-ligating orthodontic bracket is provided. The bracket in the present embodiment is analogous to an extent to the bracket in the second embodiment, but the differences are as follows:

Both the first body portion 11 and the movable closure member 30 include tool receptacles 34. The tool receptacle 34 on the first body portion 11 and the tool receptacle 34 on the movable closure member 30 are symmetrical.

In this embodiment, the two tool receptacles are approximate to an eye. The shape of the tool receptacles is special and highly recognizable.

The rest structure of the third embodiment can be referred to the second embodiment, so details are not described herein.

While the invention has been illustrated by a description of various embodiments and while these embodiments have been described in considerable detail, it is not the intention of the applicant to restrict or in any way limit the scope of the appended claims to such details. Additional advantages and modifications will readily appear to those skilled in the art.

What is claimed is:

1. A self-ligating orthodontic bracket, comprising:
a bracket body and a movable closure member, wherein the bracket body includes a first body portion, a second body portion and an archwire slot therebetween; and
the movable closure member is engaged with the second body portion and movable relative thereto between an opened position in which the archwire is insertable into the archwire slot, and a closed position in which the movable closure member retains the archwire in the archwire slot, the first body portion comprising an inward end and the movable closure member comprising an inward end, wherein the inward end of the first body portion and the inward end of the movable closure member face each other;
wherein the first body portion and/or the movable closure member includes a tool receptacle having a receptacle top and a receptacle bottom, and
the tool receptacle is provided at the inward end of the first body portion and/or the movable closure member and adjacent to the archwire slot, and the tool receptacle includes a smooth surface that slopes downward to the inward end; and
the archwire slot comprises a first side wall and a second side wall; the first sidewall of the archwire slot and the first body portion co-form a first side surface; and the second sidewall of the archwire slot and the second body portion co-form a second side surface;
wherein in operation, a tip of an opening tool is inserted into the tool receptacle, then the tip of said opening tool slides along the smooth surface downwardly to the receptacle bottom, whereby said opening tool pushes the moveable closure member so as to open the archwire slot,
wherein the smooth surface includes a first section and a second section in a sequence from a top of the smooth surface to a bottom of the smooth surface, wherein the first section is connected to the second section, and an angle between a tangent of the second section and the first side surface or the second side surface gradually decreases along the direction from the top to the bottom of the smooth surface, the second section being a curved surface that is outwardly convex.

2. The self-ligating orthodontic bracket of claim 1, wherein an angle between the tangent of the first section and the first side surface or the second side surface remains constant or gradually increases along the direction from the top to the bottom of the smooth surface.

3. The self-ligating orthodontic bracket of claim 2, wherein the first section smoothly connects to the second section.

4. The self-ligating orthodontic bracket of claim 1, wherein the bottom of the smooth surface is the receptacle bottom.

5. The self-ligating orthodontic bracket of claim 1, wherein, when viewed in a top view, the smooth surface is a curved bevel, the top of the smooth surface includes an arc shape, the smooth surface is gradually narrowed from the top to the bottom thereof, and the bottom of the smooth surface is an arc or a point.

6. The self-ligating orthodontic bracket of claim 1, wherein the tool receptacle further includes a sinking settlement step disposed on the inward end of the first body portion and/or the movable closure member, adjacent to the archwire slot, wherein the top of the smooth surface is connected to a bottom of the sinking settlement step, wherein the receptacle top is a top of the sinking settlement step.

7. The self-ligating orthodontic bracket of claim 6, wherein the sinking settlement step includes a concave surface extending along a direction perpendicular to the bottom of the archwire slot and a planar surface perpendicular to the first side surface, wherein the planar surface is connected to the top of the smooth surface.

8. The self-ligating orthodontic bracket of claim 1, wherein the first body portion includes a receiving step on the first side surface, wherein the receiving step is disposed parallel to the archwire slot.

9. The self-ligating orthodontic bracket of claim 8, wherein the smooth surface of the receptacle bottom is disposed between a base surface of the receiving step and the bottom of the archwire slot.

10. The self-ligating orthodontic bracket of claim 1, wherein the second body portion includes a sliding groove along which the movable closure member slides, having a reversed-T cross section, wherein two lateral sides of the movable closure member protrude outward to form two side lateral protrusions, while two lateral sides of the sliding groove respectively each comprise a rail along which the lateral protrusions slide.

11. The self-ligating orthodontic bracket of claim 10, wherein the movable closure member includes a guiding slider extending along the sliding direction of the movable closure member, while the sliding groove includes a guiding slot along which the guiding slider slides.

12. The self-ligating orthodontic bracket of claim 11, wherein the guiding slot is disposed on one of the two rails.

\* \* \* \* \*